United States Patent
Arambepola

(10) Patent No.: US 6,879,646 B2
(45) Date of Patent: Apr. 12, 2005

(54) QUADRATURE AMPLITUDE MODULATION DEMODULATOR AND RECEIVER

(75) Inventor: Bernard Arambepola, London (GB)

(73) Assignee: Zarlink Semiconductor Limited (GB)

( * ) Notice: Subject to any disclaimer, the term of this patent is extended or adjusted under 35 U.S.C. 154(b) by 778 days.

(21) Appl. No.: 09/834,693

(22) Filed: Apr. 13, 2001

(65) Prior Publication Data

US 2001/0030989 A1 Oct. 18, 2001

(30) Foreign Application Priority Data

Apr. 15, 2000 (GB) .............................................. 0009302

(51) Int. Cl.⁷ .............................................. H04L 27/22
(52) U.S. Cl. ...................... 375/326; 375/376; 375/344; 329/310; 329/306; 327/156
(58) Field of Search ................. 375/326, 376, 375/344, 321, 330; 329/310, 306; 327/156, 321

(56) References Cited

U.S. PATENT DOCUMENTS 5,588,027 A * 12/1996 Lim ........................... 375/330
5,636,250 A * 6/1997 Scarpa ....................... 375/321
5,754,591 A 5/1998 Samueli et al. ............. 375/235
6,016,069 A * 1/2000 Sadowski .................... 327/156
6,696,886 B1 * 2/2004 Ke et al. ..................... 327/553

FOREIGN PATENT DOCUMENTS

EP 827 311 A2 3/1998
FR 2221861 11/1974

OTHER PUBLICATIONS

Great Britain Search Report for Application No. GB 0009302.1, Issued Nov. 1, 2000.

* cited by examiner

Primary Examiner—Shuwang Liu
Assistant Examiner—Eva Zheng
(74) Attorney, Agent, or Firm—Thompson Hine LLP

(57) ABSTRACT

A QAM demodulator comprises a timing synchronizer whose output is supplied via an adaptive equalizer to a carrier synchronizer, all of which are controlled by a controller. The timing synchronizer resamples the incoming signal in the digital domain with a sampling period which, during an acquisition mode, sweeps between limit values at different rates. The controller begins an acquisition cycle at the highest rate and monotonically lowers the sweep rate until timing lock is achieved. The sampling rate is then fixed at the correct value. Similarly, the controller sweeps the local oscillator of a phase locked loop in the carrier synchronizer initially at a highest rate and at progressively lower rates until the carrier synchronizer locks to the phase of the incoming signal.

25 Claims, 7 Drawing Sheets

QUADRATURE AMPLITUDE MODULATION DEMODULATOR AND RECEIVER

BACKGROUND OF THE INVENTION

1. Field of the Invention

The present invention relates to a quadrature amplitude modulation (QAM) demodulator, for example for demodulating digital video and data signals transmitted via cable or wireless channels, and to a receiver including such a demodulator.

2. Description of the Prior Art

QAM is used for transferring digital video and data signals over cable or wireless channels. In this modulation scheme, the phase and amplitude of a sinusoidal carrier wave are modulated by the digital information. For example, in the modulation scheme known as QAM256, each symbol is chosen from a set of 256 possible amplitude-phase combinations. Thus, each symbol may represent 8 bits of digital data.

Known types of QAM demodulators make use of timing synchronisers and carrier synchronisers. For example, a typical known timing synchroniser resamples incoming sampled digital signals from an upstream analogue-to-digital converter (ADC). The ADC is free-running in the sense that it is not phase-locked to the transmitted symbol clock. It is not practical to make the ADC sampling rate equal to a multiple of the symbol rate because this may vary for any given communication channel.

A known type of timing synchroniser comprises a digital phase locked loop (DPLL). The DPLL re-samples the signal from the ADC and digitally interpolates the values of samples between the samples from the ADC. A timing error is computed from the re-sampled signal and is filtered and fed back to control the phase of the resampling. When the re-sampling phase matches the timing used by the transmitting modulator, the timing error vanishes and the DPLL locks.

During a timing acquisition mode of the timing synchroniser, the resampling rate or period is swept between upper and lower values unless and until lock is established in the DPLL. The incoming QAM signal may have a wide range of signal-to-noise ratios and an unpredictable amount of multipath. If the sweep rate is chosen to be sufficiently low to permit locking in conditions where the incoming signal has a low signal-to-noise ratio and/or is subjected to a high level of multipath, the timing synchroniser may lock incorrectly when presented with a signal of higher signal-to-noise ratio and/or of lower multipath. Conversely, if the sweep rate is relatively high, the timing synchroniser may fail to lock in the presence of signals of poorer signal-to-noise ratio and/or multipath. The choice of sweep rate is therefore a function of signal-to-noise ratio and multipath but these are unknown. The sweep rate must therefore be selected as a compromise between conflicting requirements.

If a high sweep rate is chosen, timing synchroniser lock may only be achieved with relatively good quality incoming signals. Conversely, if a lower sweep rate is chosen, the presence of high quality incoming signals may result in false lock being achieved.

Known QAM demodulators also make use of carrier synchronisers embodied, for example, as DPLLs which are used to lock to the carrier frequency and phase of the incoming signal. The frequency of a locally generated signal is similarly swept until the DPLL achieves lock and similar compromises in the sweep rate have to be made.

SUMMARY OF THE INVENTION

According to a first aspect of the invention, there is provided a quadrature amplitude modulation demodulator comprising a timing synchroniser for resampling an incoming sampled quadrature amplitude modulated signal and a controller for controlling the timing synchroniser, the timing synchroniser having an acquisition mode in which the incoming signal is resampled with a sampling period which sweeps between first upper and lower limit values at a plurality of different rates, the controller being arranged to initiate an acquisition cycle at the highest sweep rate and to reduce the sweep rate monotonically and to switch the timing synchroniser to a tracking mode if a timing error is below a first threshold.

The controller may be arranged, in the acquisition mode, to repeat each sweep rate a first predetermined number of times before selecting the next sweep rate.

The controller may be arranged, in the acquisition mode, to repeat the acquisition cycle a second predetermined number of times. The controller may be arranged to institute a shift in the frequency band of the incoming signal if the timing error has not fallen below the first threshold after the acquisition cycle or cycles and to initiate a further acquisition cycle.

The demodulator may comprise an adaptive multipath equaliser connected to the timing synchroniser, the controller being arranged to disable adaption of the equaliser until the timing error falls below the first threshold. The controller may be arranged to initiate another acquisition cycle of the timing synchroniser if the equaliser is unable to complete adaption in a predetermined time period.

The demodulator may comprise a carrier synchroniser for locking the phase of a locally generated signal to a carrier of the incoming signal.

The controller may be arranged to disable the carrier synchroniser until the equaliser has completed adaption.

The carrier synchroniser may have an acquisition mode in which the frequency of the locally generated signal sweeps between second upper and lower limit values at a plurality of different rates, the controller being arranged to initiate a carrier acquisition cycle at the highest sweep rate and to reduce the sweep rate monotonically and to switch the carrier synchroniser to a tracking mode if a carrier synchronisation error is below a second threshold.

According to a second aspect of the invention, there is provided a quadrature amplitude demodulator comprising a carrier synchroniser for locking the phase of a locally generated signal to a carrier of an incoming signal and a controller for controlling the carrier synchroniser, the carrier synchroniser having an acquisition mode in which the frequency of the locally generated signal sweeps between second upper and lower limit values at a plurality of different rates, the controller being arranged to initiate a carrier acquisition cycle at the highest sweep rate and to reduce the sweep rate monotonically and to switch the carrier synchroniser to a tracking mode if a carrier synchronisation error is below a second threshold. The controller may be arranged, in the carrier synchroniser acquisition mode, to repeat each sweep rate a third predetermined number of times before selecting the next sweep rate.

The controller may be arranged, in the carrier synchroniser acquisition mode, to repeat the carrier acquisition cycle a fourth predetermined number of times.

The controller may be arranged to return the carrier synchroniser to the acquisition mode if the mean square error of the demodulated symbols remains above a third threshold for a predetermined time period.

According to a third aspect of the invention, there is provided a receiver including a demodulator according to the first or second aspect of the invention.

It is thus possible to provide a demodulator which is capable of rapidly and reliably locking onto an incoming QAM signal even when such a signal has a poor signal-to-noise ratio and high multipath. By initially using the highest sweep rate, false locking in the presence of good quality incoming signals can be substantially avoided or reduced. By reducing the sweep rate as necessary until lock is achieved, even poor quality signals can be captured with a high probability. Thus, compromises in sweep rate and demodulator synchronisation can be substantially avoided or reduced.

BRIEF DESCRIPTION OF DRAWINGS

The invention will be further described, by way of example, with reference to the accompanying drawings, in which.

Like reference numerals refer to like parts throughout the drawings.

DESCRIPTION OF THE PREFERRED EMBODIMENT

Figure 1:
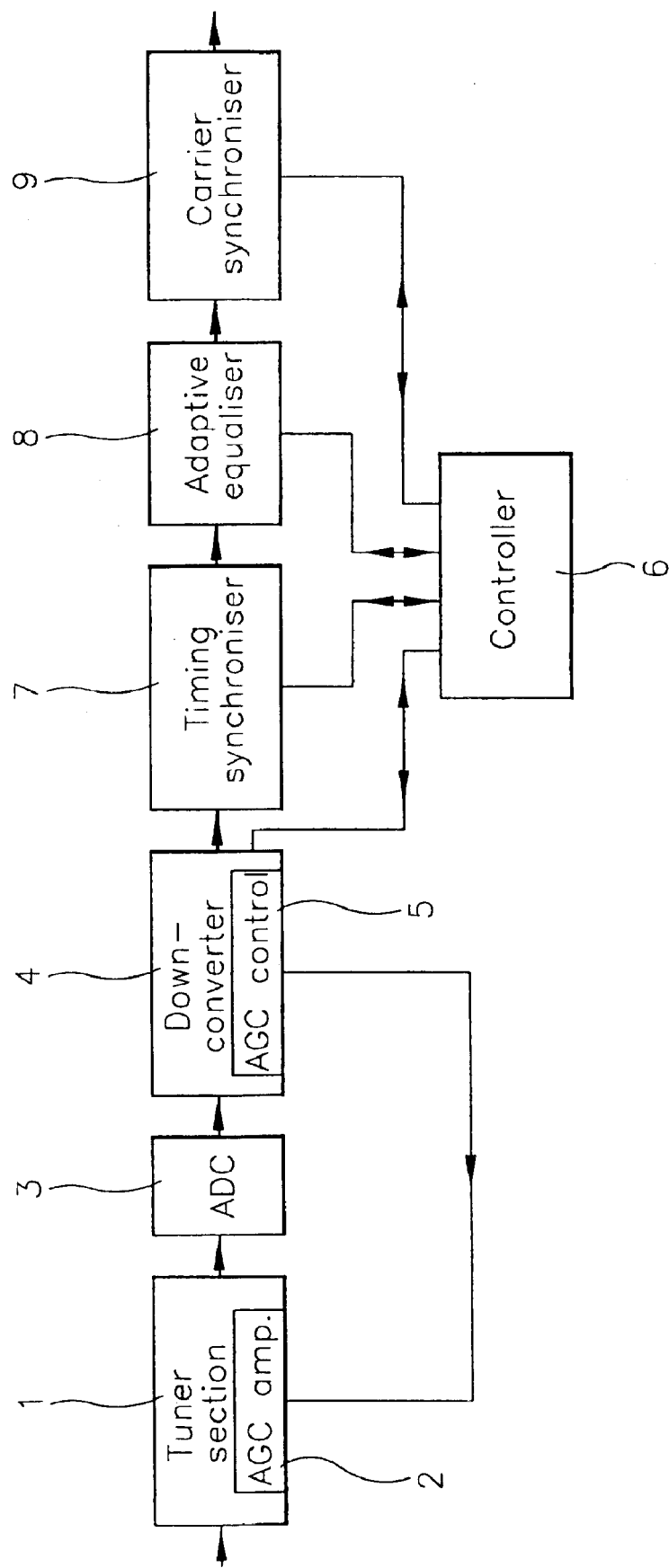
FIG. 1 is a block circuit diagram of a receiver comprising a tuner and a QAM demodulator constituting an embodiment of the invention.

The tuner and demodulator shown in FIG. 1 comprise a tuner section 1 which receives a signal, for example, from a cable distribution network or a satellite aerial via a suitable head unit. As is known, the tuner section 1 selects a desired channel and converts this to a fixed intermediate frequency. The tuner section 1 also includes an automatic gain control (AGC) amplifier 2 whose gain is controlled so as to present signals of substantially constant amplitude envelope at the output of the tuner section 1.

In a typical example of such a tuner and demodulator for use with a cable network, the tuner section 1 selects a channel having a bandwidth of 6 or 8 MHz centred at 7 MHz. This signal is supplied to an analogue-to-digital converter (ADC) 3 which samples the incoming analogue signal and converts the samples to digital code. In practice, the ADC 3 is free-running in the sense that its sampling rate is not phase-locked to the transmitted symbol clock. It is not possible to make the sampling rate equal to a multiple of the symbol rate of the transmitted signal because service providers reserve the right to transmit at any symbol rate, for example between 1 and 7 MBaud in the case of an 8 MHz channel. Also, there may be situations in which the transmitted symbol rate is not known.

The output of the ADC 3 is connected to a down-converter 4 which translates the frequency spectrum from the intermediate frequency to baseband with a spectrum centred nominally at zero frequency. The down-converter 4 also comprises an AGC control circuit 5 which supplies a control signal to the AGC amplifier 2 in the tuner section 1. The down-converter 4 is connected to a controller 6 whose operation will be described hereinafter.

The output of the down-converter 4 is connected to a timing synchroniser 7 whose purpose is to obtain samples at the centres of the symbol periods in the incoming signal. The timing synchroniser 7 comprises a digital phase locked loop (DPLL) which resamples the signal using digital interpolation. A timing error is computed from the resampled signal and is filtered and fed back to control the phase of resampling. When the resampling phase and rate match the timing used for modulating the signal by the service provider, the timing error vanishes and the DPLL locks.

The timing synchroniser 7 has an acquisition mode in which the sampling period or rate is varied or swept between upper and lower limit values. The sweep rate may be continuously variable or may be selectable from among a plurality of different sweep rates. The sweep is stopped when the timing synchroniser achieves lock. Operation of the timing synchroniser 7 is again controlled by the controller 6.

The output of the timing synchroniser 7 is connected to an adaptive equaliser 8 whose purpose is to compensate for channel multipath effects. For example, in a cable network, signal reflections can occur within consumer premises or in the main network. Similarly, in wireless applications, reflections can occur from leaves and buildings. The effect of such multiple paths is to create at the input of the demodulator a summation of copies of the same transmitted signal with each copy having a different delay, attenuation and phase shift. The delays of multipath echoes may amount to several symbol periods and cause the transmitted symbols to interfere with each other. The equaliser 8 is in the form of a digital filter whose coefficients may be continuously changed to compensate for the effects of channel multipath. The equaliser 8 is also controlled by the controller 6.

The output of the equaliser 8 is supplied to a carrier synchroniser 9 which is used to lock onto the phase of the incoming signal. The carrier synchroniser 9 is again based on a DPLL and has an acquisition mode in which the frequency of the local oscillator of the DPLL is swept at different rates until an error signal indicative of the phase error between the incoming signal and the local oscillator falls below a suitable threshold value. The sweep is then stopped and the DPLL remains locked to the incoming signal.

The carrier synchroniser 9 provides the error signals in the form of a mean square error as follows. When phase lock is achieved, the carrier synchroniser 9 generates a demodulated version of the transmitted signal. For example, in the case of a QAM256 signal, each modulated symbol corresponds to one of 256 amplitude-phase combinations. When the whole demodulator is in lock, the demodulated symbols are close to these 256 points. However, there is some departure from these ideal points due to the presence of noise. The mean square error (MSE) refers to the average of the squared difference between the actual received symbols and the idealised points.

The mean square error is used to control the modes of operation of the adaptive equaliser 8 and the carrier synchroniser 9. When the mean square error is sufficiently low, the adaptive equaliser 8 switches from a mode known as "blind equalisation" to a mode known as "decision feedback mode". Equalisers of this type and using these modes are, for example, disclosed in J. R. Treichler et al, "Practical Blind Demodulators for High-Order QAM Systems", Proceedings of the IEEE, vol. 86 No. 10 October 1998 pp. 1907–1926 and C. R. Johnson et al, "Blind Equalisation using the Constant Modulus Criterion: A Review", Proceedings of the IEEE, vol. 86 No. 10 October 1998 pp. 1927–1950, the contents of which are incorporated herein by reference.

Because multipath distortion in this type of system results from previously transmitted symbols corrupting the current symbol, with the demodulator locked, the previously transmitted symbols are known and parts of these can be subtracted from the current symbol in the equaliser. In this mode, the equaliser 8 automatically adapts its operation to provide best performance.

Figure 2:
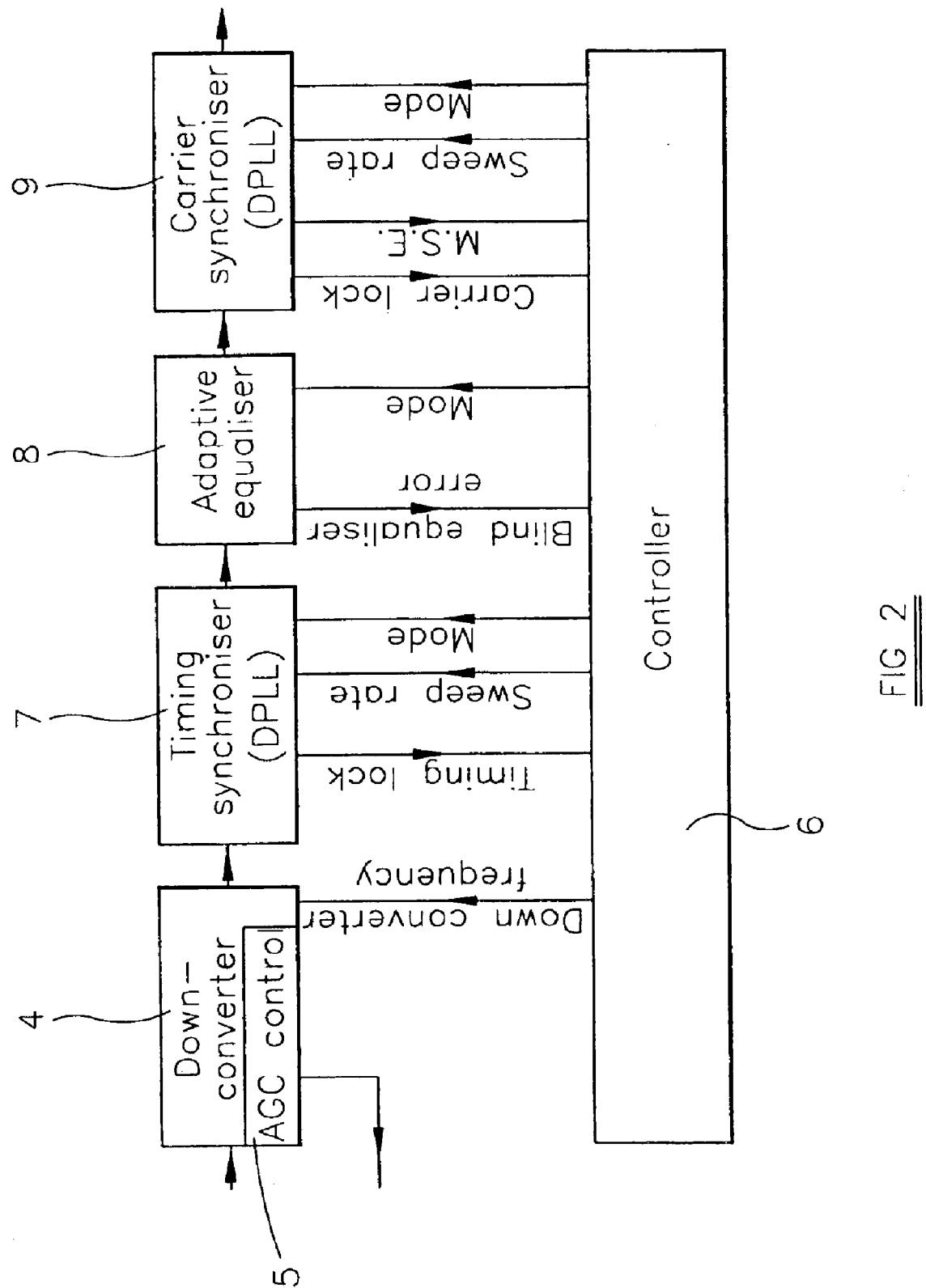
FIG. 2 is a block circuit diagram of the QAM demodulator of FIG. 1.

FIG. 2 illustrates the down-converter 4 and the elements 6 to 9 which constitute the QAM demodulator of FIG. 1. FIG. 2 may be regarded as a block circuit diagram in which the individual blocks represent individual devices or modules of the demodulator. However, FIG. 2 may also be regarded as a functional diagram for illustrating operation rather than the particular construction of the demodulator. Thus, for convenience, the various functions have been divided between the blocks in a convenient way which may or may not represent the construction of the demodulator.

The controller 6 may be embodied in any suitable way. For example, the controller may be in the form of a state machine implemented in hardware or software. Also, the controller 6 may be part of a central processing unit which in addition controls other functions of the tuner.

The controller 6 supplies a control signal to the down-converter 4 for controlling the down-conversion frequency. This signal may be used to shift the frequency band occupied by the output signal of the down-converter 6 as described hereinafter.

The timing synchroniser 7 supplies to the controller 6 a timing lock signal which indicates when an averaged timing error signal within the timing synchroniser 7 is below a threshold. The controller 6 supplies signals to the timing synchroniser 7 to control the sweep rate and the mode of operation thereof.

The adaptive equaliser 8 supplies a blind equalisation error signal to the controller 6 indicating the degree of equalisation error when the equaliser 8 is in the blind operating mode. The controller 6 supplies a mode signal to the equaliser 8 to switch between the blind mode and the decision feedback mode of the equaliser 8.

The carrier synchroniser 9 supplies to the controller 6 a phase lock signal which indicates when an averaged phase error signal within the carrier synchroniser 9 is below a threshold. The carrier synchroniser 9 also supplies the mean square error signal to the controller 6, which compares this with several threshold values. The controller 7 also supplies sweep rate control and mode signals to the carrier synchroniser 9.

Figure 3A:
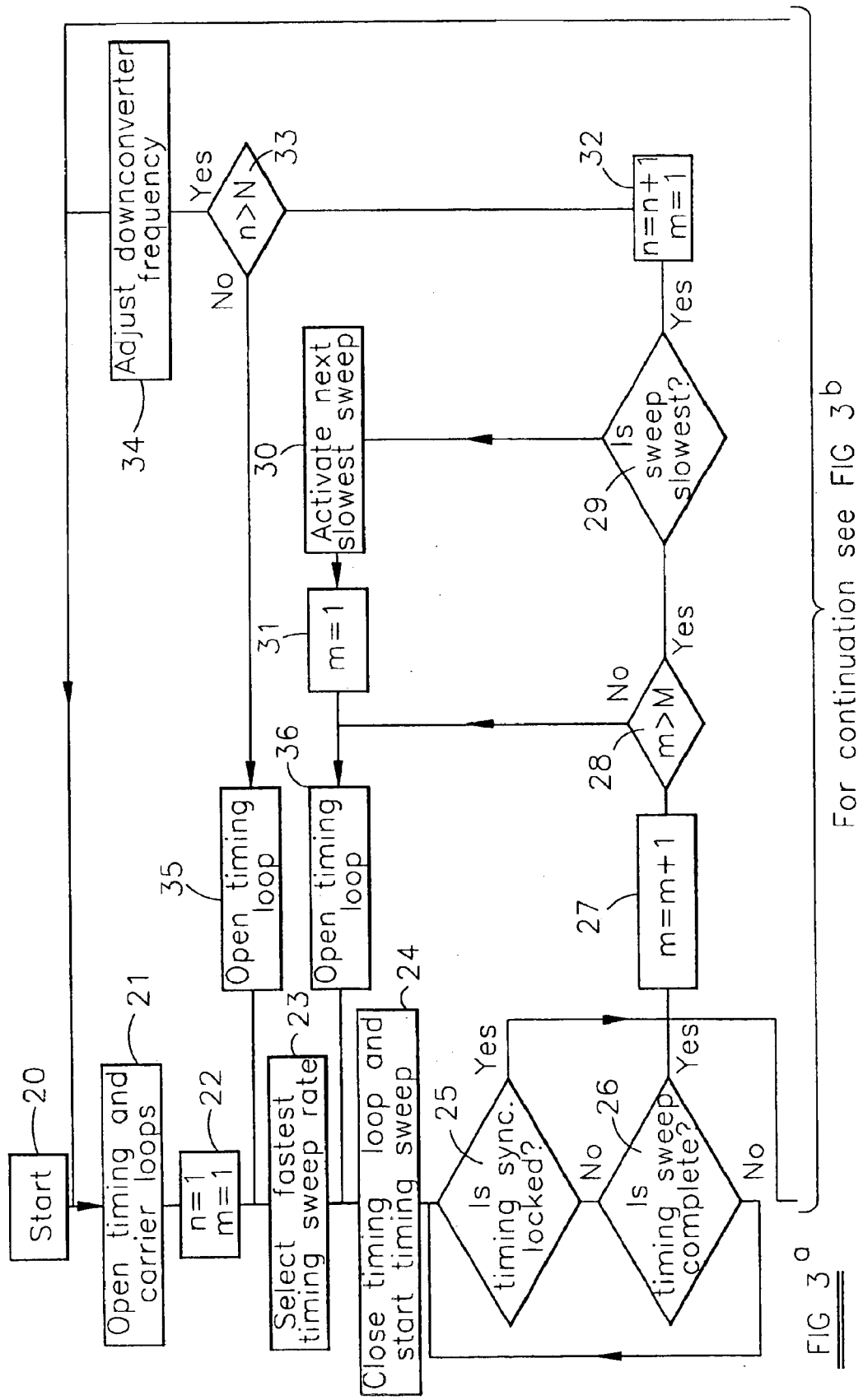
FIGS. 3 and 4 are a flow diagram illustrating operation of the QAM demodulator shown in FIG. 1.
Figure 3:
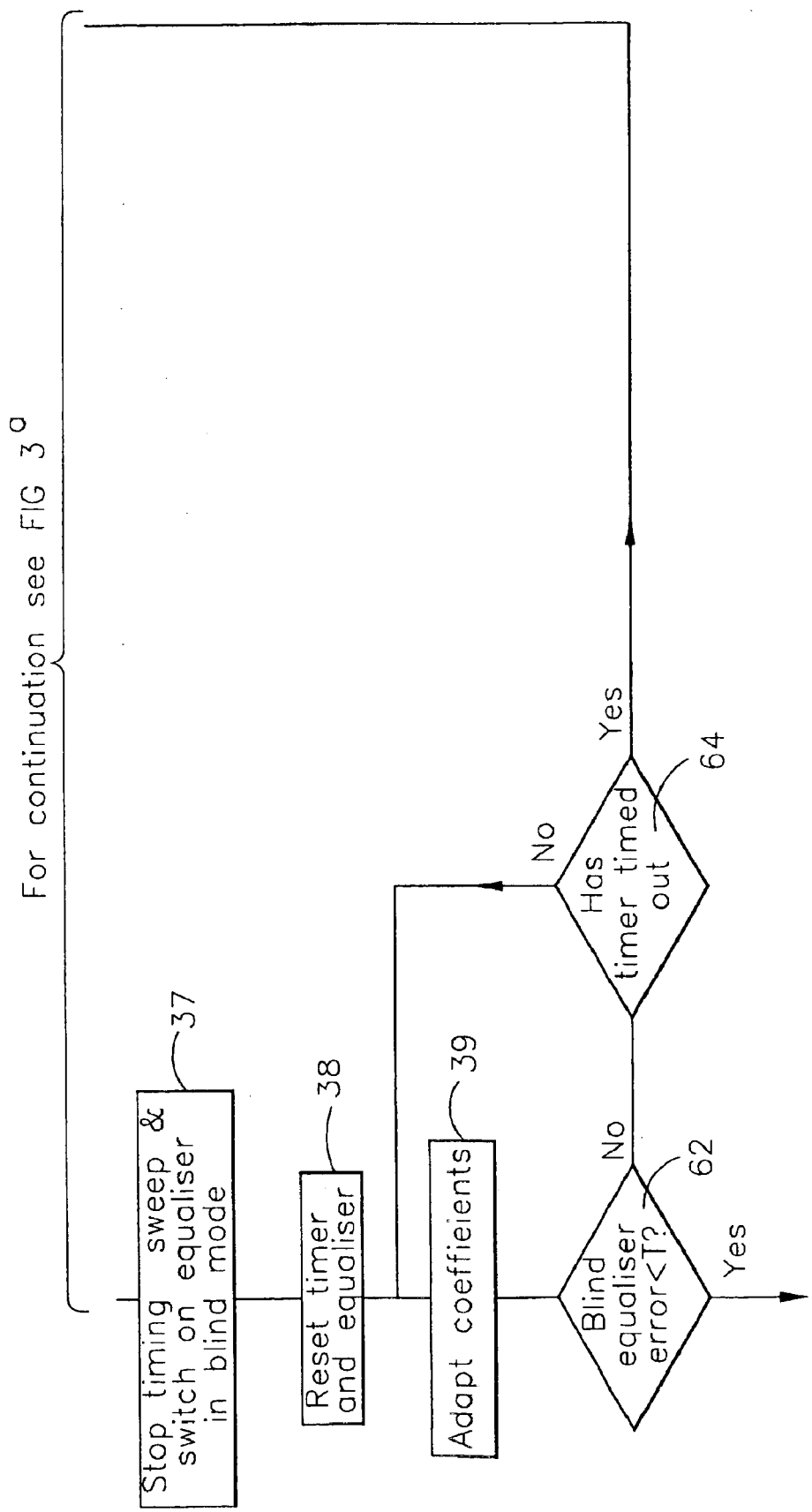
Figure 4A:
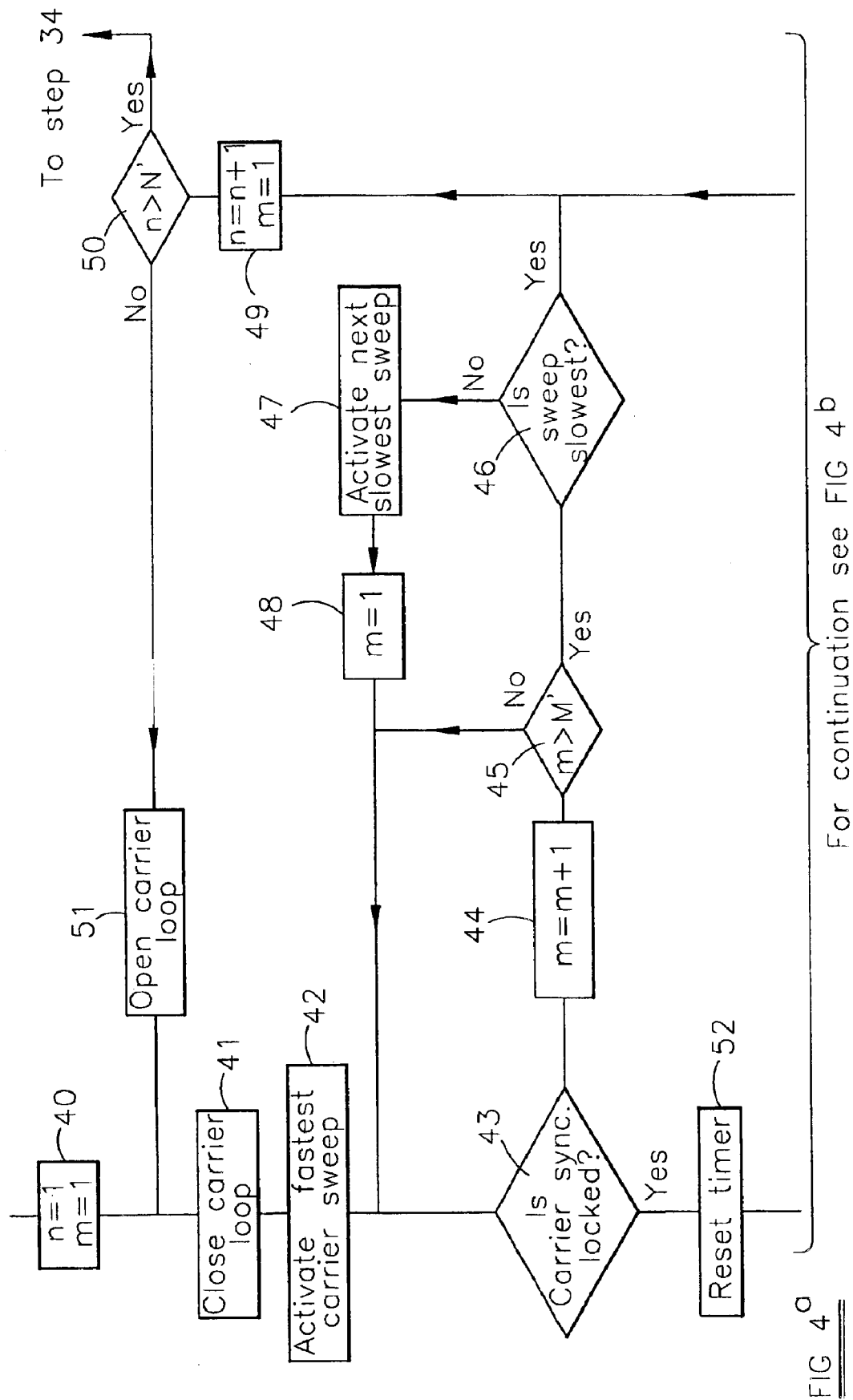
Figure 4B:
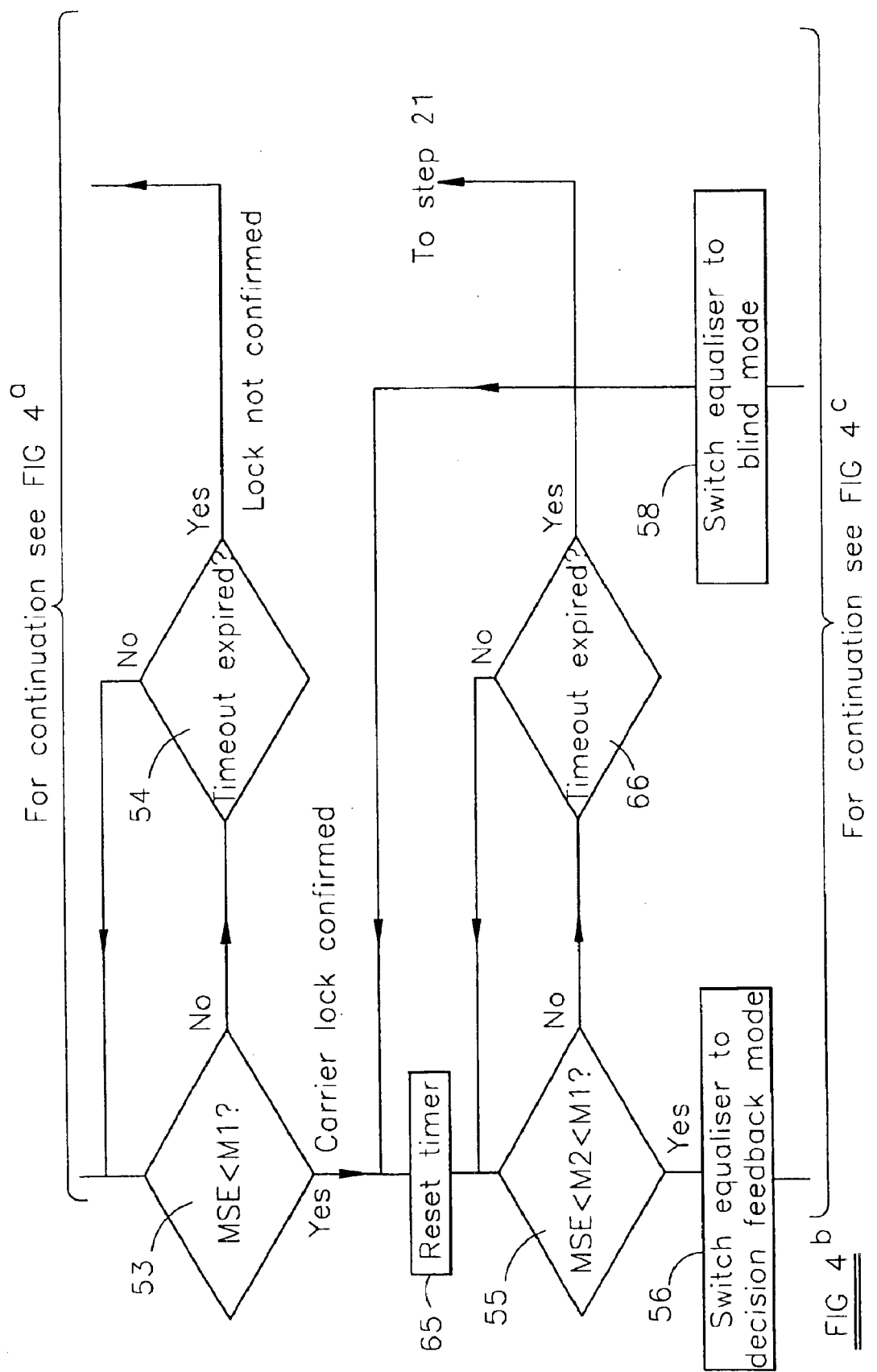
Figure 4C:
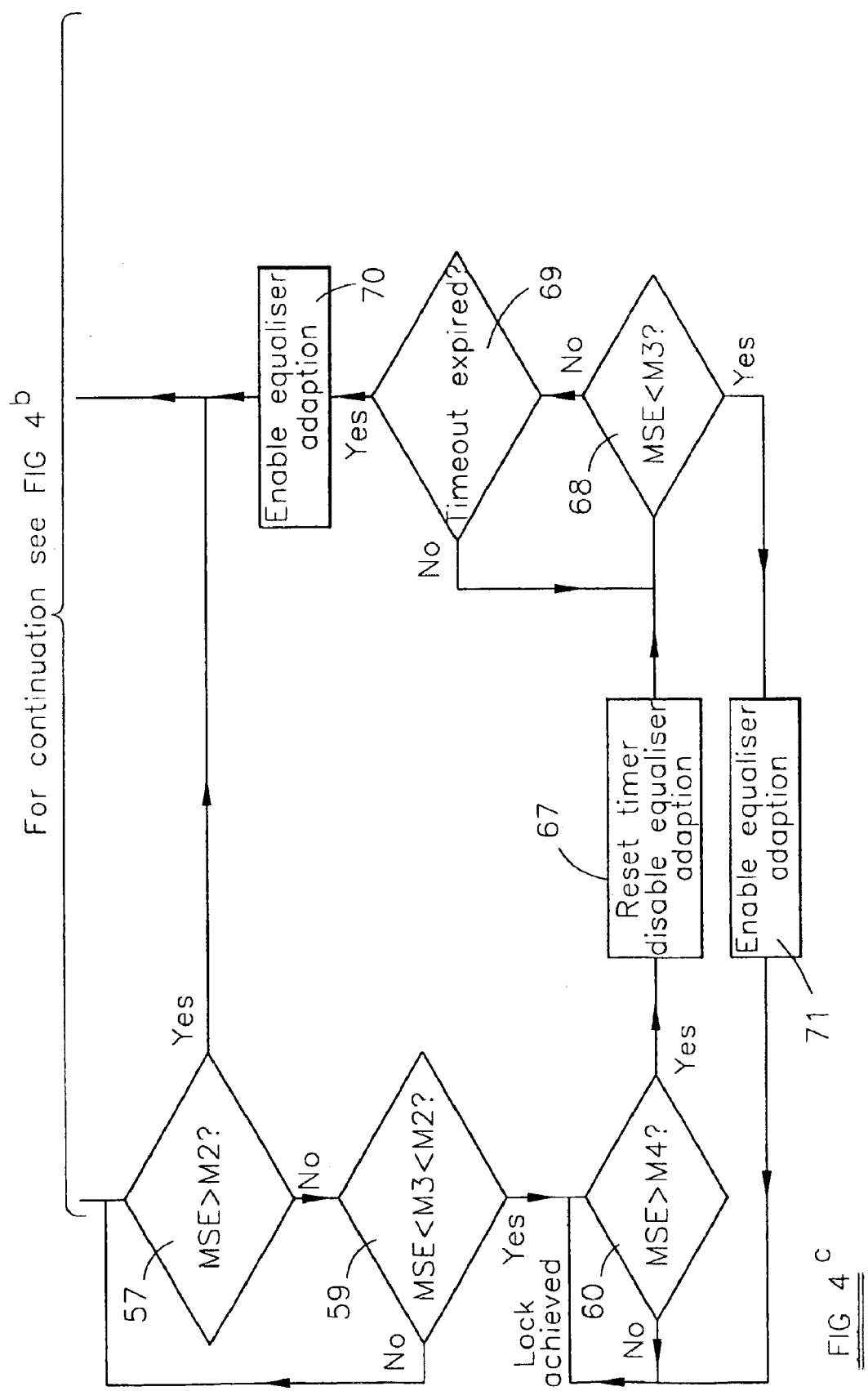

The controller 6 controls operation of the demodulator in accordance with the flow diagram in FIGS. 3 and 4. When the demodulator is switched on, control begins at a start step 20. A step 21 opens the timing and carrier phase locked loops in the timing synchroniser 7 and the carrier synchroniser 9, respectively. A step 22 resets parameters m and n to 1 and a step 23 selects the fastest timing sweep rate. The phase locked loop in the timing synchroniser 7 is closed and the sweep is started in a step 24. The re-sampling rate or period in the timing synchroniser 7 is varied or swept from one limit value to another limit value at the highest available rate i.e. in the lowest available time period. A step 25 determines whether the timing synchroniser achieves lock during this sweep by monitoring the timing lock signal supplied by the synchroniser 7. If lock is not achieved and if completion of the sweep is detected in a step 26, a step 27 increments the value of the parameter m by 1 and a step 28 determines whether a maximum value M of the parameter m has been achieved. If not, a step 36 opens the timing loop and the sweep is repeated at the same rate in the steps 24 to 26.

If timing synchroniser lock is not achieved following M sweeps at the highest rate, a step 29 determines whether the sweep rate is the slowest available sweep rate. If not, a step 30 activates the next slowest sweep rate, the parameter m is reset to 1 in a step 31, and control returns to the step 36.

If the step 29 determines that the slowest sweep rate has been used, a step 32 resets the parameter m to 1 and increments the parameter n by 1 and a step 33 determines whether the maximum value N of the parameter n has been achieved. If not, a step 35 opens the timing loop and control returns to the step 23.

Thus, the acquisition mode of the timing synchroniser 7 involves repeating each sweep speed M times and repeating each cycle of sweep speeds N times unless timing synchroniser lock is detected. If no such lock is detected, a step 34 adjusts the down-converter frequency by supplying a suitable signal to the down-converter 4. Control then returns to the step 21 and the cycle of operations is repeated with the shifted or re-centred frequency band of the incoming signal. These operations are then repeated until the step 25 detects locking of the timing synchroniser 7.

When the step 25 detects that the timing synchroniser 7 has been locked, the timing sweep is stopped and the adaptive equaliser 8 is switched on in the blind equalisation mode in a step 37. A timer and the equaliser are reset in a step 38 and the coeffients of the digital filter forming the equaliser 8 are allowed to adapt in a step 39. A step 62 determines whether the blind equaliser error has fallen below a threshold T. If not, a step 64 determines whether the timer has timed out. If not, the steps 39 and 62 are repeated until either the blind equalisation error falls below the threshold T or the timer times out after a predetermined period.

If the equaliser 8 cannot adapt sufficiently to reduce the error below the threshold T, this is indicative of a false locking of the timing synchroniser 7. The step 64 thus returns control to the step 21 and the timing synchroniser is returned to its lock acquisition mode as described hereinbefore. Conversely, if the blind equaliser error falls to below the threshold T, the carrier synchroniser 9 is operated in its acquisition mode with the adaptive equaliser remaining in its blind mode.

A step 40 resets the parameters m and n to 1 and a step 41 closes the loop of the carrier synchroniser 9. A step 42 activates the fastest carrier sweep by supplying the appropriate sweep rate signal to the carrier synchroniser 9. The frequency of the local oscillator of the DPLL in the carrier synchroniser 9 is swept at its fastest rate between the limit values and a step 43 determines whether carrier lock is achieved by observing the carrier synchroniser phase lock signal. If not, the parameter m is incremented by 1 in a step 44 and is compared with its maximum value M' in a step 45, where M' may be equal to or different from M. If the parameter m has not exceeded its maximum value, the step 43 is repeated with the same sweep rate. However, if M' sweeps at this sweep rate have been completed and no lock has been detected, a step 46 determines whether the sweep rate is the slowest available rate. If not, a step 47 activates the next slowest sweep rate, a step 48 resets the parameter m to 1, and the step 43 is repeated. Thus, in the absence of lock being detected, each sweep rate is tried M' times.

When the step 46 indicates that the slowest sweep rate has been tried without success, a step 49 resets the parameter m to 1 and increments the parameter n and a step 50 compares this with its maximum value N', which may be equal to or different from N. If the maximum value N' has not been exceeded, a step 51 opens the carrier loop and the steps 41 to 48 are repeated. Thus, the whole cycle of repeated sweep rates is repeated N' times unless and until carrier lock is achieved. Conversely, if carrier lock is not achieved, control returns to the step 34 and the whole procedure is repeated.

When the step 43 detects carrier lock, the sweep is stopped and a timer is reset in a step 52. A step 53 confirms carrier lock by comparing the mean square error (MSE) with a threshold M1. If the MSE does not become less than M1 during a predetermined period as determined in a step 54, control returns to the step 49.

If the MSE falls below the threshold M1 before the end of the predetermined period, carrier lock is confirmed, a step 65 resets another timer and a step 55 compares the MSE with another threshold M2 which is less than the threshold M1. If the MSE is less than M2, a step 56 switches the adaptive equaliser 8 to the decision feedback mode. Although not shown in FIG. 4, an algorithm for adapting the threshold M2 to actual signal conditions may also be provided. For as long as the MSE remains above the threshold M2, a step 66 repeats the step 55. If the MSE remains above the threshold M2 continuously until the timer has timed out, the step 66 returns control to the step 21 and reacquisition of demodulator lock is repeated from the beginning.

After switching the equaliser to the decision feedback mode in the step 56, a step 57 compares the MSE with the threshold M2. If the MSE exceeds the threshold M2, a step 58 switches the equaliser to the blind mode and control returns to the step 65. Although not shown in FIG. 4, a count is kept of the number of times that the equaliser is switched from the blind mode to the decision feedback mode and back to the blind mode. If this exceeds a predetermined limit, control returns to the step 21 for reacquisition of lock.

A step 59 tests whether the MSE is less than another threshold M3 which is less than the threshold M2. If not, the step 57 is repeated. The steps 57 and 59 are subjected to a timer such that, if the MSE does not fall below the threshold M3 within a predetermined time period, control is passed to the step 58 which switches the equaliser to the blind mode and returns control to the step 65. If the MSE becomes less than the threshold M3, the step 59 indicates that lock has been achieved so that the demodulator operates in its locked or tracking state.

In this tracking state, a step 60 continuously compares the MSE with a threshold M4. If the MSE exceeds the threshold M4, a step 67 resets a further timer and disables adaptation of the equaliser 8 so that the current values of the equaliser coefficients are held. A step 68 compares the MSE with the threshold M3. If the MSE remains above the threshold M3 until the timer has timed out as tested in a step 69, equaliser adaptation is recommenced in a step 70, the equaliser is switched to the blind mode in the step 58 and control returns to the step 65. However, if the MSE falls below the threshold M3 before the further timer times out, a step 71 re-enables equaliser adaptation and control returns to the step 60 so that the demodulator remains in the locked or tracking state.

Data demodulated by the QAM demodulator may be subjected to Forward Error Correction (FEC) so as to reduce the bit error rate, as required by compressed video and data communication applications. If such an FEC is present, an FEC synchronisation or lock indicator may be provided and may be used to confirm and control the controller 6 of the demodulator.

It has been found that the mean square error may rise during operation of the demodulator, for example because of impulsive noise in the channel or a change in the multipath scenario. Provided the mean square error resulting from this does not rise to too large a value, the equaliser 8 may be "retrained", first in the blind mode and then in the decision feedback mode, without reacquiring carrier or timing lock so that the demodulator can continue to function with no break in the output signal which it supplies. However, if the errors become too large, then it may be necessary to reacquire carrier lock. If carrier lock cannot then be achieved, it is necessary to restart the whole locking procedure with the inevitable break in the output signal from the demodulator.

By operating the timing and carrier loops initially at their highest sweep rates, the probability of the demodulator going into a false lock condition in the presence of good quality signals (high signal-to-noise ratio and/or low multipath) can be made very low and the probability of correct lock can conversely be made very high so that false locking can be substantially reduced. However, by sweeping at progressively decreasing rates, the chances of locking with a poor quality signal (low signal-to-noise ratio and/or high multipath) can be made very high so that the demodulator reliably locks onto any signals within a large range of qualities with a very high probability. Further, the demodulator is able to retain lock despite substantial disturbances occurring during the locked mode of operation. Thus, breaks in the demodulated signals can be reduced or even substantially eliminated if such disturbances are not excessive. Even if breaks do occur, lock can be regained with a very high degree of reliability.

What is claimed is:

1. A quadrature amplitude modulation demodulator comprising a timing synchroniser for resampling an incoming sampled quadrature amplitude modulated signal and a controller for controlling said timing synchroniser, said timing synchroniser having an acquisition mode in which said incoming signal is resampled with a sampling period which sweeps between first upper and lower limit values at a plurality of different timing synchroniser sweep rates, said controller being arranged to initiate an acquisition cycle at a higher one of said timing synchroniser sweep rates, to reduce a timing synchroniser sweep rate monotonically and to switch said timing synchroniser to a tracking mode if a timing error is below a first threshold.

2. A demodulator as claimed in claim 1, in which said controller is arranged, in said acquisition mode, to repeat each of said sweep rates a first predetermined number of times before selecting a next of said sweep rates.

3. A demodulator as claimed in claim 1, in which said controller is arranged, in said acquisition mode, to repeat said acquisition cycle a second predetermined number of times.

4. A demodulator as claimed in claim 1, in which said controller is arranged to institute a shift in a frequency band of said incoming signal if said timing error remains above said first threshold after said acquisition cycle and to initiate a further acquisition cycle.

5. A demodulator as claimed in claim 1, comprising an adaptive multipath equaliser connected to said timing synchroniser, said controller being arranged to disable adaption of said equaliser until said timing error falls below said first threshold.

6. A demodulator as claimed in claim 5, in which said controller is arranged to initiate another acquisition cycle of said timing synchroniser if said equaliser is unable to complete adaption in a predetermined time period.

7. A demodulator as claimed in claim 1, comprising a carrier synchroniser for locking a phase of a locally generated signal to a carrier of said incoming signal.

8. A demodulator as claimed in claim 5, comprising a carrier synchroniser for locking a phase of a locally generated signal to a courier of said incoming signal and in which said controller is arranged to disable said carrier synchroniser until said equaliser has completed adaption.

9. A demodulator as claimed in claim 7, in which said carrier synchroniser has an acquisition mode in which a frequency of a locally generated signal sweeps between second upper and lower limited values at a plurality of different carrier synchroniser sweep rates, said controller being arranged to initiate a carrier acquisition cycle at a higher one of said carrier synchroniser sweep rates, to reduce a carrier synchroniser sweep rate monotonically and to switch said carrier synchroniser to tracking mode if a carrier synchronisation error is below a second threshold.

10. A demodulator as claimed in claim 9, in which said controller is arranged, in said carrier synchroniser acquisition mode, to repeat each of said carrier synchroniser sweep rates a third predetermined number of times before selecting a next of said carrier synchroniser sweep rates.

11. A demodulator as claimed in claims 9, in which said controller is arranged, in said carrier synchroniser acquisition mode, to repeat said carrier acquisition cycle a fourth predetermined number of times.

12. A demodulator as claimed in claim 9, in which said controller is arranged to return said carrier synchroniser to said acquisition mode if a mean square error of demodulated symbols remains above a third threshold for a predetermined time period.

13. A quadrature amplitude demodulator comprising a carrier synchroniser for locking a phase of a locally generated signal to a carrier of an incoming signal and a controller for controlling said carrier synchroniser, said carrier synchroniser having an acquisition mode in which a frequency of a locally generated signal sweeps between upper and lower limit values at a plurality of different carrier synchroniser sweep rates, said controller being arranged to initiate a carrier acquisition cycle at a higher one of said sweep rates, to reduce a sweep rate monotonically and to switch said carrier synchroniser to a tracking mode if a carrier synchronisation error is below a first threshold.

14. A demodulator as claimed in claim 13, in which said controller is arranged, in said acquisition mode, to repeat each of said sweep rates a predetermined number of times before selecting a next of said sweep rates.

15. A demodulator as claimed in claims 13, in which said controller is arranged, in said acquisition mode, to repeat said carrier acquisition cycle a predetermined number of times.

16. A demodulator as claimed in claim 13, in which said controller is arranged to return said carrier synchroniser to said acquisition mode if a mean square error of demodulated symbols remains above a second threshold for a predetermined time period.

17. A receiver comprising a quadrature amplitude modulation demodulator, the quadrature amplitude modulation demodulator including a timing synchroniser for resampling an incoming sampled quadrature amplitude modulated signal and a controller for controlling said timing synchroniser, said timing synchroniser having an acquisition mode in which said incoming signal is resampled with a sampling period which sweeps between first upper and lower limit values at a plurality of different sweep rates, said controller being arranged to initiate an acquisition cycle at a higher one of said sweep rates, to reduce a sweep rate monotonically and to switch said timing synchroniser to a tracking mode if a timing error is below a first threshold.

18. A receiver comprising a quadrature amplitude demodulator, the quadrature amplitude demodulator including a carrier synchroniser for locking a phase of a locally generated signal to a carrier of an incoming signal and a controller for controlling said carrier synchroniser, said carrier synchroniser having an acquisition mode in which a frequency of a locally generated signal sweeps between upper and lower limit values at a plurality of different sweep rates, said controller being arranged to initiate a carrier acquisition cycle at a higher one of said sweep rates, to reduce said sweep rate monotonically and to switch said carrier synchroniser to a tracking mode if a carrier synchronisation error is below a first threshold.

19. A demodulator as claimed in claim 1, in which said controller is arranged to initiate said acquisition cycle for said timing synchronizer at a highest of said timing synchroniser sweep rates.

20. A demodulator as claimed in claim 9, in which said controller is arranged to initiate said carrier acquisition cycle at a highest of said carrier synchroniser sweep rates.

21. A demodulator as claimed in claim 13, in which said controller is arranged to initiate said carrier acquisition cycle at a highest of said sweep rates.

22. A receiver as claimed in claim 17, in which said controller is arranged to initiate said acquisition cycle at a highest of said sweep rates.

23. A receiver as claimed in claim 18, in which said controller is arranged to initiate said carrier acquisition cycle at a highest of sweep rates.

24. A quadrature amplitude modulation demodulator comprising a timing synchroniser for resampling an incoming sampled quadrature amplitude modulated signal and a controller for controlling said timing synchroniser, said timing synchroniser having an acquisition mode in which said incoming signal is resampled with a sampling period which sweeps between first upper and lower limit values at a plurality of different timing synchroniser sweep rates, said controller being arranged to initiate an acquisition cycle at a first one of said timing synchroniser sweep rates, determining whether said timing synchroniser achieves a lock at a completion of a sweep between said upper and lower limit values at said first timing synchronizer sweep rate, selecting a different one of said timing synchroniser sweep rates if a lock is not achieved at said first timing synchroniser sweep rate, and switching said timing synchroniser to a tracking mode if a lock is achieved.

25. A demodulator as claimed in claim 24, further comprising a carrier synchroniser for locking a phase of a locally generated signal to a carrier of said incoming signal, in which said carrier synchroniser has an acquisition mode in which a frequency of a locally generated signal sweeps between second upper and lower limited values at a plurality of different carrier synchroniser sweep rates, said controller being arranged to initiate a carrier acquisition cycle at a first one of said carrier synchroniser sweep rates, determining whether said carrier synchroniser achieves a lock at a completion of a sweep between said upper and lower limit values at said first carrier synchronizer sweep rate, selecting a different one of said carrier synchroniser sweep rates if a lock is not achieved at said first timing synchroniser sweep rate, and switching said carrier synchronizer to a tracking mode if a lock is achieved.

* * * * *